United States Patent [19]

Ward et al.

[11] 4,408,192
[45] Oct. 4, 1983

[54] METHOD AND DEVICE FOR USE BY DISABLED PERSONS IN COMMUNICATING

[76] Inventors: Geoffrey A. Ward, Cheltenham; Kevin E. Forward, Coburg, both of Australia

[21] Appl. No.: 253,517
[22] PCT Filed: Aug. 8, 1980
[86] PCT No.: PCT/AU80/00047
§ 371 Date: Apr. 8, 1981
§ 102(e) Date: Apr. 2, 1981
[87] PCT Pub. No.: WO81/00478
PCT Pub. Date: Feb. 19, 1981

[30] Foreign Application Priority Data
Aug. 8, 1979 [AU] Australia .............................. PD9923

[51] Int. Cl.³ .......................... G08B 21/00; A61B 5/10
[52] U.S. Cl. ..................................... 340/407; 128/733; 128/782; 340/573
[58] Field of Search ................ 340/407, 573; 307/116; 128/782, 733, 902

[56] References Cited

U.S. PATENT DOCUMENTS 3,022,878  2/1962  Seibel et al. .
3,241,115  3/1966  Maling .
3,507,376  4/1970  Kafafian .
3,831,296  8/1974  Hagle .............................. 340/407 X

FOREIGN PATENT DOCUMENTS 479396   6/1974  Australia .
2812091  10/1979  Fed. Rep. of Germany .
2395559  1/1979  France .
8000047  8/1980  World Intel. Prop. Org. .

OTHER PUBLICATIONS

A Communication System Prosthesis by Steadman et al., pp. 93–95.

Primary Examiner—John W. Caldwell, Sr.
Assistant Examiner—Daniel Myer
Attorney, Agent, or Firm—Andrus, Sceales, Starke & Sawall

[57] ABSTRACT

A method and device for use by disabled persons in communicating includes sensors (1) for producing first, second, and third time indeterminate electrical signals responsive to different voluntary muscle movements of the disabled person. Three different muscles, each with a single state or one muscle with three different states may be used. The signals form a code indicative of communicating indicia. A microcomputer (3), connected to a visual display, translates the sensor signals into an output signal that produces visually perceptible communicating indicia on the display (5).

12 Claims, 4 Drawing Figures

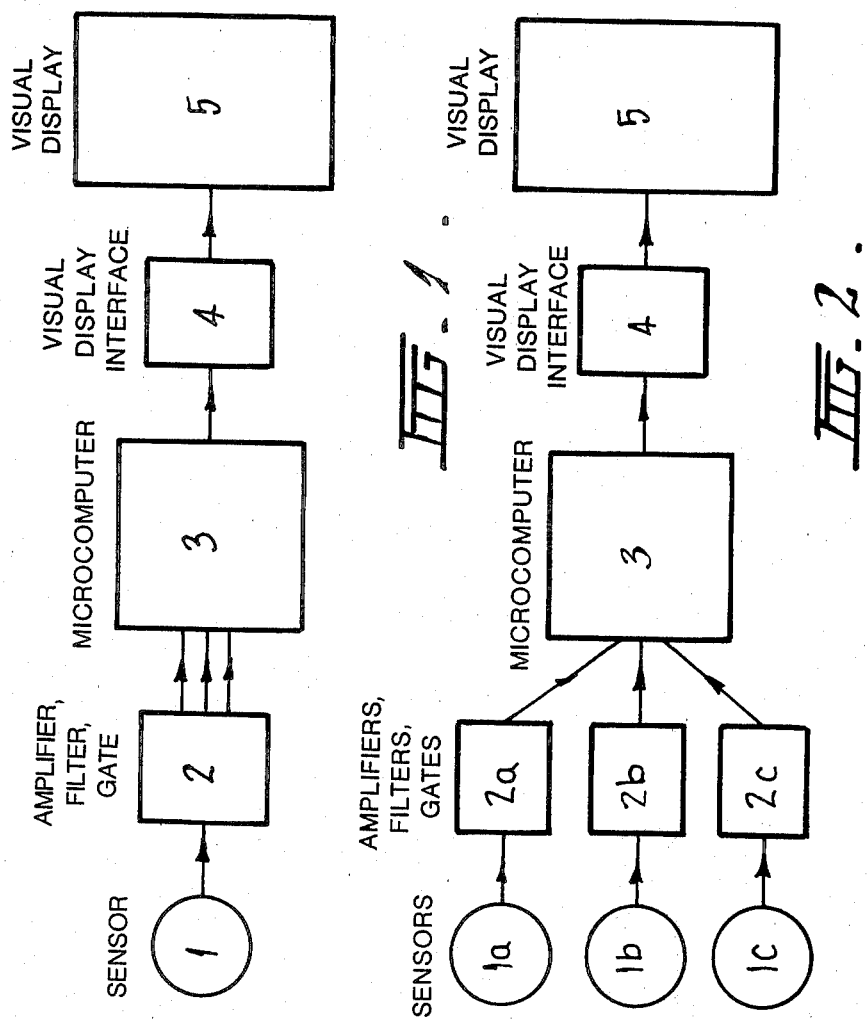

METHOD AND DEVICE FOR USE BY DISABLED PERSONS IN COMMUNICATING

Reference is hereby made to the Microfiche Appendix comprised of one fiche containing 26 frames.

This invention relates to communication. In a particular aspect this invention relates to communication by disabled persons.

It is well known that persons who are disabled by accident, illness or congenital defects can have great difficulty in communicating with others.

Various communicators are known which can be used by disabled persons. One communicator uses motion of the eyeball in a manner similar to the motions of writing and by means of sensors that motion is reproduced as letters or drawings on a visual display; that communicator although excellent is tiring and difficult to use. Further, it must be used with some order of rapidity to be effective. Another communicator utilized a visual display to display letters, a cursor was scanned across the letters and when it was in a position representing a desired letter a signal was given by a cursor to store that letter. The stored letter and other stored letters were then displayed as a word. That communicator is also excellent but relied on the ability of the user to react in sufficient time to cursor movement to select a desired letter.

Although the above described communicators work well they are not suited to all disabled persons particularly those who are so severely disabled as to have insufficiently fast controllable reactions.

The present invention provides a method of communicating characterized by sequentially, detecting at least one of a positive voluntary muscle movement of a first character being time indeterminate above a threshold as an electrical signal of first character, and a positive voluntary muscle movement of a second character being time indeterminate above a threshold as an electrical signal of second character, and detecting a positive voluntary muscle movement of a third character being time indeterminate above a threshold as an electrical signal of third character, and interpreting the signals produced as a code representing a communication, translating the code into a signal adapted to produce a visual display, and visually displaying the communication on a visual display device.

The present invention also provides apparatus for communicating characterized in comprising means for producing a first electrical signal in response to a positive voluntary muscle movement of first character being time indeterminate above a threshold, means for producing a second electrical signal in response to a positive voluntary muscle movement of second character being time indeterminate above a threshold, means for producing a third electrical signal in response to a positive voluntary muscle movement of third character being time indeterminate above a threshold, means for translating at least one of said first electrical signal and said second electrical signal and said third electrical signal as a code into an output signal adapted to produce a visual display.

The apparatus preferably comprises a visual display device which may be a separate element.

Although the muscle movements of first, second and third character are not time determinate in the sense that the period of their existence determines whether the first, second or third electrical signal is produced or translated, problems such as spurious triggering, tremor and contact bounce or similar phenomena suggests that each of the movements of first, second and third character should be sustained over a threshold being a minimum period of time. That minimum period of time may be variable to suit various users.

The code used may require for a single symbol that several of said first electrical signal and/or several of said second electrical signal be given sequentially. Said third electrical signal may be conveniently used to designate the end of a code for a symbol and several of said third electrical signal can be used to designate the end of a word and/or sentence.

In a preferred aspect, such as is produced of said first electrical signal and said second electrical signal are stored in a memory and on the detection of said third electrical signal the decoding and visual displaying occurs.

The code may be conveniently stored as a "look-up" table in a computer which can also effect the production of the visual display.

The code itself need not be any particular code but for at least the reason that it is well known it is preferred to use the Morse code but without its time dependence; thus, conveniently, said first electrical signal may represent the "dot" of Morse code, said second electrical signal may represent the "dash" of Morse code and one of said third electrical signal may represent the space in Morse code which should exist at the end of a code sequence representing an alphanumeric symbol, two of said third electrical signal may represent the space in Morse code which should exist at the end of a code sequence representing a word and three of said third electrical signal may represent the space in Morse code which should exist at the end of a code sequence representing a sentence: in a most preferred form the end of a sentence should cause a full stop to be displayed and the next letter to be displayed to be displayed as a capital letter.

Further, the code itself may have more complex elements representing whole words or sentences in abbreviated form which can be recalled from memory on receipt of the appropriate code sequence and displayed as the visual display. Naturally, code sequences for calling up said more complex elements should not conflict with normal Morse code sequences. It may be that a person using the apparatus can feed to memory for subsequent recall those words and sentences for which he has particular use.

Concerning the voluntary muscle movements, these will depend on the person for whom the apparatus is intended but two general cases can be stated. In one case, three individual voluntary muscles are used to act on three sensors. In the other case, one voluntary muscle capable of producing three different movements is used to act on one or three sensors. In the case in which one sensor is used it should be capable of discriminating between the three different movements.

In said one case each muscle will cause a separate signal to be given and those separate signals are to be translated as a code.

In the case in which one sensor is used three different signals should be obtained and in this instance discrimination between the three different movements is conveniently done by a comparison of voltage levels.

Two specific constructions of apparatus in accordance with this invention will now be described with the aid of the accompanying drawings in which:

FIG. 1 is a block diagram of one apparatus using a single sensor,

FIG. 2 is a block diagram of another apparatus using three sensors,

Figure 3:
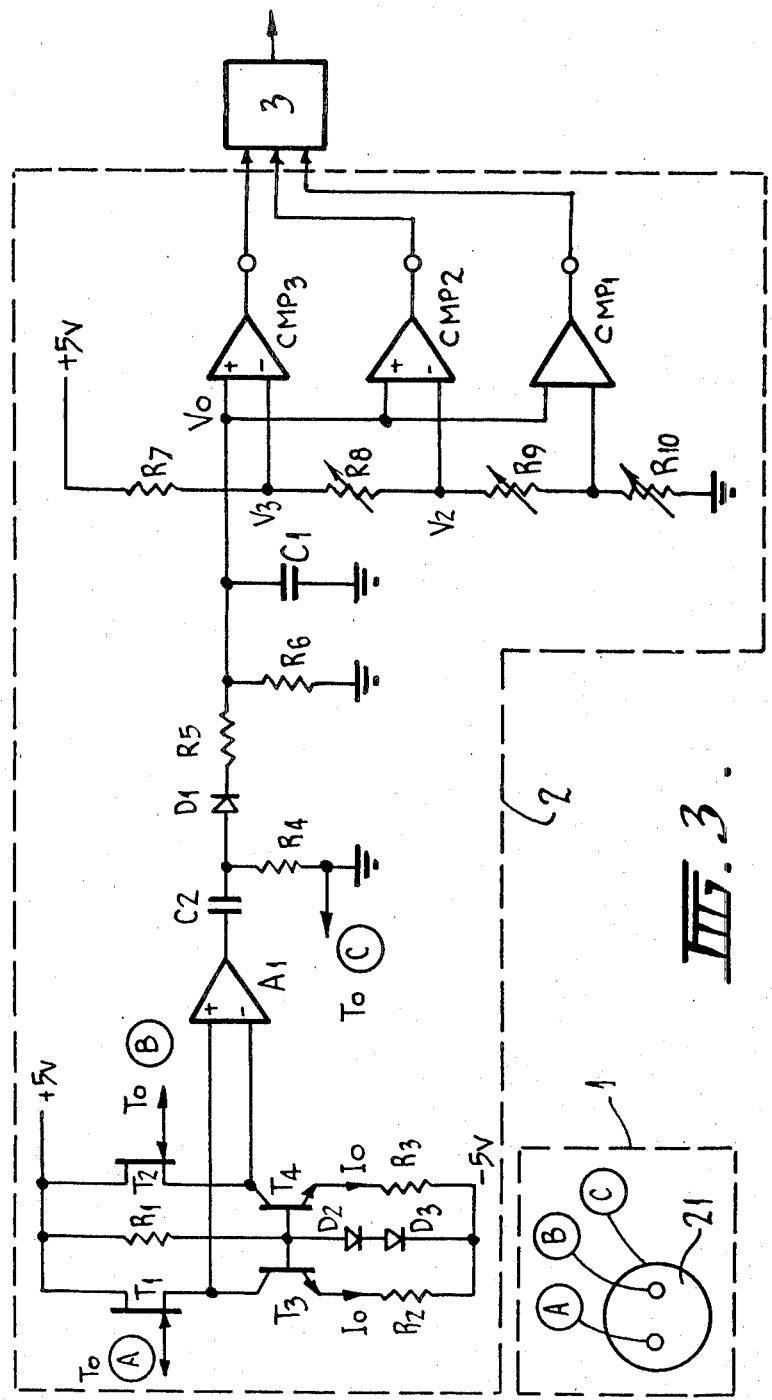
FIG. 3 is a circuit diagram of part of the apparatus of FIG. 1.

The apparatus shown in FIG. 1 comprises said sensor 1, an amplifier filter and gate unit 2 having three output ports which feed to a microcomputer 3, a visual display interface 4 and a visual display 5.

Reference will now be made to FIG. 3. The sensor 1 comprises first and second gold plated electrodes A and B set in an insulating support 21 and a guard ring C. In use, the sensor 1 is fitted to the skin of a disabled person in suitable proximity to a muscle which can be voluntarily excited by the person. A suitable electrode paste may be used to ensure good skin contact.

The amplifier, filter and gate unit 2 shown in FIG. 2 has the shown circuit diagram.

Values and components are as follows:

$R_1 = 47$ Kohm $R_2, R_3 = 5.6$ Kohm $R_4 = 1$ Kohm $R_5 = 270$ Ohm $R_6 = 10$ Kohm $R_7 = 1$ Kohm $R_8, R_9, R_{10} = 10$ Kohm potentiometers $C_1 = 10$ microfarad $C_2 = 0.47$ microfarads $T_1, T_2 = 2N4220A$ field effect transistors $T_3, T_4 = B\ C\ 547$ silicon bipolar transistors $D_1, D_2, D_3 = 0A202$ Silicon diodes $A_1 = LF\ 352$ amplifier with voltage gain of 500

$CMP_1, CMP_2, CMP_3 =$ each one quarter of MLM339 quad amplifier acting as comparators The values and components given are merely exemplary. Other values and components might be used.

It is to be noted that $T_1$ and $t_2$ are connected to the electrodes A and B and that the guard ring C is connected in the circuit where shown.

Power supplies for the amplifiers are not shown in FIG. 3; the amplifiers are fed by the $\pm 5$ V buses.

The outputs from the comparators $CMP_1$-$CMP_3$ are fed to input ports of the microcomputer 3.

The manner of operation of the circuit of FIG. 3 will now be described.

As stated, the electrodes A and B are positioned in proximity of a voluntary muscle which can be excited by a person and as that muscle is excited into a state of tension the surface voltage caused by that action will be detected by the electrodes A and B. That voltage is pulsatile in nature. The pulses are amplified by the transistors $T_1$, $T_2$, $T_3$ and $T_4$ and the amplifier $A_1$. The amplified signal is then rectified and filtered by the diode $D_1$, resistors $R_5$ and $R_6$ and the capacitor $C_1$.

The resistors $R_5$ and $R_6$ and the capacitor $C_1$ are chosen such that the voltage $V_0$ rises in a time less than, $T_1$ seconds. $T_1$ is typically 0.1 seconds but adjustment of component values can vary this if desired and can be held constant within limits, to be detailed below, for a time greater than $T_1$ seconds. The level of voltage $V_0$ is detected by the comparators $CMP_1$, $CMP_2$ and $CMP_3$. If the voltage, $V_0$, is below $V_1$ the output voltage from all comparators is zero. If $V_0$ rises above $V_1$ the output from $CMP_1$ will be greater than $+3V$ and the output from $CMP_2$ and $CMP_3$ will be zero. If $V_0$ is above $V_2$ the outputs of both $CMP_1$ and $CMP_2$ will be greater than $+3V$ and the output from $CMP_3$ will be zero. If $V_0$ rises above $V_3$ the output from all comparators will be greater than $+3V$. Thus the outputs from the comparators indicate the level of the voltage $V_0$ and hence the level of muscle tension.

The person using the apparatus sends messages by exciting the muscle in a series of levels of tension, each of which is held for at least $T_1$ seconds and each of which is preceded and followed by a period of at least $T_1$ seconds when the muscle is relaxed. The outputs of the three comparators, $CMP_1$ $CMP_2$ and $CMP_3$ are connected to an input port of the microcomputer 3 which interprets zero voltage as the number zero and voltage above 3 volts as the number 1. If $V_0$ is below $V_1$ the microcomputer port input is 000, if it is above $V_1$ but below $V_2$ it is 001. While if $V_0$ is above $V_2$ but below $V_3$ the input to the microcomputer is 011. The input is 111 if $V_0$ is above $V_3$. The microcomputer is programmed to read the ports until it detects a 000. It then reads the ports until it reads 001, 011 or 111. The microcomputer then waits until the input is again 000 and then it reads the ports until the input is again 001, 011 or 111. To ensure that each level read is valid the port is read for a period equal to $T_1$ seconds and only signals which are constant over that period are considered valid. The sequence of valid signals is recorded by the microcomputer. A message is delimited by the number 111 and thus consists of a sequence of 001's and 011's. The microcomputer has stored in its memory a table of messages each of which is keyed to a unique sequence of 001's and 011's. That table is conveniently based on Morse code with 001 representing a dot, 011 representing a dash and 111 representing a space. When the microcompouter detects a valid sequence it outputs via the interface 4 to display the corresponding message on the visual display device 5. The visual display device 5 might be a cathode ray tube, an electric typewriter, a teletype, a printer or a series of character display units.

Figure 4:
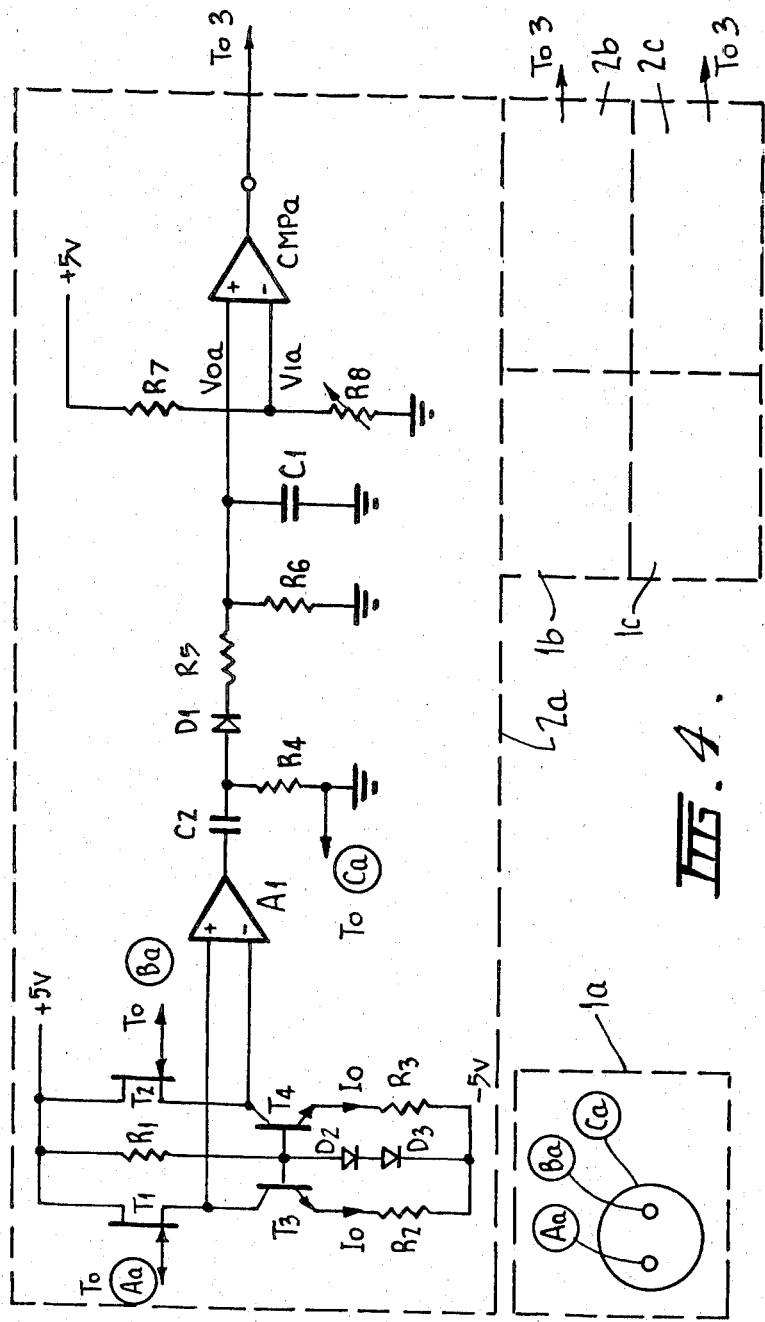
FIG. 4 is a circuit diagram of part of the apparatus of FIG. 1.

The apparatus shown in FIGS. 2 and 4 is similar to that of FIGS. 1 and 3 and like reference numerals denote like parts. However, in this instance there are three sensors 1a, 1b, and 1c and independent amplifiers, filters and single gate units 2a, 2b and 2c.

The sensors 1a, 1b, and 1c are identical to sensor 1 but are used each in respect of a different voluntary muscle and are connected to a respective one of the units 2a, 2b and 2c.

The units 2a, 2b and 2c are similar to unit 2 of FIG. 3 and the circuit of unit 2a is shown in FIG. 4. Units 2b and 2c and sensors 1b and 1c are shown schematically in FIG. 4 and are identical to unit 2a and sensor 1a respectively.

Referring now to FIG. 4, the values and components of unit 2a are the same as shown in FIG. 3 with $CMP_a$ once again being one quarter of a MLM339 amplifier.

The manner of operation of the unit 2a is essentially the same as that of unit 2 but three voltage levels are not detected and instead the level of voltage $V_{0a}$ is detected by the comparator $CMP_a$. If the voltage, $V_{0a}$, is below $V_{1a}$ the output from the comparator $CMP_a$ will be zero. If $V_{0a}$ rises above $V_{1a}$ the output from $CMP_a$ will be greater than +3V. The microcomputer 3 interprets an output of $CMP_a$ of zero volts as the number zero and a voltage greater than 3V as the number 1.

Similar outputs are derived from units 2b and 2c and are fed to the microcomputer ports. The microcomputer 3 reads the ports as before as causes a display as before in respect of FIGS. 1 and 3.

The microcomputer 3 can be any microcomputer capable of performing the ncessary tasks but as guidance it may be said that Applicants have had good success with an 8 bit microcomputer having 256 bytes of RAM for storing messages and 1K byte ROM for storing the table of messages. Computer 3 may be a Zilog Z80-MCG having a Z80 central processing unit, 16K dynamic RAM and 8K ROM. Visual display interface 4 may comprise a Matrox video board type ALTR 2480. Display 5 may comprise an ordinary televison set or CRT computer terminal.

However, to allow for special codes to produce sentences it is believed that from 16-64K bytes RAM and 1-4K ROM may be more suitable.

The circuits described are of high impedance and hence comparatively safe and also less susceptible to skin contact resistance effects.

The above described apparatus will enable seriously disabled persons to communicate notwithstanding that they have control over only one or three voluntary muscles.

We claim:

1. Apparatus for use by disabled persons in communicating characters by voluntary muscle movement comprising: means for producing a first electrical signal in response to a positive voluntary muscle movement of a first character that is time indeterminate above a threshold means for producing a second electrical signal in response to a positive voluntary muscle movement of a second character that is time indeterminate above a threshold; means for producing a third electrical signal in response to a positive voluntary muscle movement of a third character that is time indeterminate above a threshold; and translation means coupled to said signal producing means and responsive to said signals for translating said signals into an output signal adapted to produce a visual character display, said translating means utilizing a signal code in which characters are indicated by the sequential occurrence of components capable of exhibiting two different signal characteristics, said first and second signals indicating said signal code components and said third signal indicating intervals therebetween.

2. The apparatus as claimed in claim 1, including a visual display device coupled to said translating means and operable by said output signal for displaying the characters.

3. The apparatus as claimed in claim 1 wherein said signal producing means for said first, second, and third electrical signals includes a single sensor and includes discriminator means adapted to output three electrical signals in response to three different movements of a single voluntary muscle.

4. The apparatus as claimed in claim 1 wherein said means for producing said first, second, and third electrical signals includes three sensors, each adapted to output an electrical signal in response to movement of three different voluntary muscles.

5. The apparatus as claimed in claim 1 wherein said signal producing means for said first, second, and third electrical signals includes a single sensor and includes discriminator means adapted to output three electrical signals in response to three different movements of a single voluntary muscle.

6. The apparatus as claimed in claim 1 wherein said discriminator means is adapted to discriminate between three voltage levels, each of which is produced as a result of a respective one of the three different movements of the single voluntary muscle.

7. The apparatus as claimed in claim 1 wherein said means for producing said first, second, and third electrical signals includes three sensors, each adapted to output an electrical signal in response to movement of three different voluntary muscles.

8. The apparatus as claimed in claim 1 wherein said translating means is further defined as utilizing a signal code in which characters are indicated by a sequential occurrence of components capable of having two different time durations, one of said first and second signals being indicative of a signal code component of one time duration, the other of said first and second signals being indicative of a signal code component of a different time duration.

9. A method for use by disabled persons in communicating characters by voluntary muscle movement comprising: detecting a positive voluntary muscle movement of a first character that is time indeterminate above a threshold as a first electrical signal; detecting a positive voluntary muscle movement of a second character that is time indeterminate above a threshold as a second electrical signal; detecting a positive voluntary muscle movement of a third character that is time indeterminate above a threshold as a third electrical signal ascertaining from the signals, a character to be communicated by a signal code in which charcters are indicated by the sequential occurrence of components capable of having two different signal characteristics, the first and second signals being used to indicate the signal code components and said third signal indicating intervals therebetween; and forming an output signal from the signal ascertainment indicative of the character to be communicated.

10. The method as claimed in claim 1 wherein the detecting step is further defined as detecting three different movements of a single voluntary muscle for producing the electrical signals.

11. The method of claimed in claim 1 wherein the detection step is further defined as detecting three different voltage levels produced in consequence of a respective one of the three different movements.

12. The method as claimed in claim 1 wherein the detecting step is further defined as detecting the movement of three different voluntary muscles of the disabled person for producing the electrical signals.

* * * * *